United States Patent [19]
Chilzer

[11] 4,349,209
[45] Sep. 14, 1982

[54] SNOW SHUTTLE

[76] Inventor: Edward L. Chilzer, 796 E. Main St., Monongahela, Pa. 15063

[21] Appl. No.: 176,762

[22] Filed: Aug. 11, 1980

[51] Int. Cl.³ .............................................. B62B 13/04
[52] U.S. Cl. ...................................... 280/16; 188/8; 280/12 K; 280/21 R
[58] Field of Search .................. 280/16, 15, 17, 21 R, 280/12 K, 12 KL, 12 R, 605; 188/8

[56] References Cited
U.S. PATENT DOCUMENTS

| | | | |
|---|---|---|---|
| 2,440,785 | 5/1948 | Porter | 280/16 X |
| 2,479,674 | 8/1949 | Elliott | 280/16 |
| 2,894,760 | 7/1959 | Kolstad | 280/23 X |
| 3,545,560 | 12/1970 | Fox | 280/21 R X |
| 3,667,772 | 6/1972 | Eggert | 280/16 |

FOREIGN PATENT DOCUMENTS

| | | | |
|---|---|---|---|
| 163017 | 5/1949 | Austria | 280/16 |
| 2301275 | 9/1976 | France | 280/605 |
| 98935 | 4/1923 | Switzerland | 280/21 R |

*Primary Examiner*—Joseph F. Peters, Jr.
*Assistant Examiner*—Milton L. Smith
*Attorney, Agent, or Firm*—Victor J. Evans & Co.

[57] ABSTRACT

A snow shuttle for use in winter recreation upon hills and the like in which the shuttle includes a forward steering section, a frame area pivotally connected thereto, a seating area disposed upon the frame, and a braking apparatus similarly carried on the frame so that the shuttle can be controlled both by steering and braking. Ribs are provided on the bottom face of the steering mechanism and the frame for added stability and control.

5 Claims, 5 Drawing Figures

SNOW SHUTTLE

BACKGROUND OF THE INVENTION

Man's fascination and preoccupation with winter activities have existed perhaps as long as man's ability to withstand the ravages of winter's temperature. To this end, the most readily discernible differences between the seasons has not only been the associated foliage and colors, but also the ability to manipulate on terrain having diverse surface conditions e.g. snow and ice.

To this end, various devices have been proposed in the past which allow people to benefit from gravity and traverse downhill for amusement, and the following patents reflect the state of the art of which applicant is aware in so far as they appear to be germane to the patent process at hand:

U.S. Pat. No. 2,447,700; Hassman
U.S. Pat. No. 3,830,513; Hunt
U.S. Pat. No. 2,963,299; Smith
U.S. Pat. No. 3,917,301; Fabris
U.S. Pat. No. 3,744,811; Johnston Of these, it should be apparent that although a seated device has been provided for the occupant who is to be propelled by gravity down a hill, the steering associated with these devices has traditionally been the ability to lean and benefit from a side-cut of a single ski, but the skill with which one can manipulate such a mono-ski determines how long the ride will last.

It should be apparent that the skill level required to maintain one's balance on these skis is substantially the same as that required from a conventional skiing arrangement, or in fact the skill level may be somewhat higher since there is only a single ski upon which to balance rather than two which is the usual arrangement.

In any event, none of these references disclose, contemplate, or render obvious the apparatus at hand which can be characterized in that a device has been provided that does not rely upon the intrinsic balance of a person due to the frame's relative breadth so as to provide stability, a steering mechanism articulated to the frame is provided so that control can be maintained by traversing down rather steep sections of a hill, and braking is provided should the need for its use arise unexpectedly.

OBJECTS AND SUMMARY OF THE INVENTION

Accordingly, it is an object of this invention to provide a device which can be used by a person having relatively little experience in skiiing but who can experience the exhilaration and pleasure of hurtling down a mountain.

It is another object of this invention to provide a device of the character described above which is comparatively safe to use when contrasted with the prior art, being provided with steering mechanisms and braking mechanisms the deployment of which can be made readily apparent to the novitiate.

It is yet a further object of this invention to provide a device of the character described above which is relatively safe to use, durable in construction, and relatively inexpensive to manufacture.

It is yet a further object of this invention to provide a device of the character described above in which plural people can be accommodated on a single device for additional pleasure.

It is yet a further object of this invention to provide a device of the character described above in which the aerodynamic design thereof is aesthetically pleasing and extremely functionally so that the device in use is highly reliable.

These and other objects will be made manifest when considering the following detailed patent application when taken in conjunction with the appended drawing figures.

BRIEF DESCRIPTION OF THE PREFERRED EMBODIMENT

Figure 1:
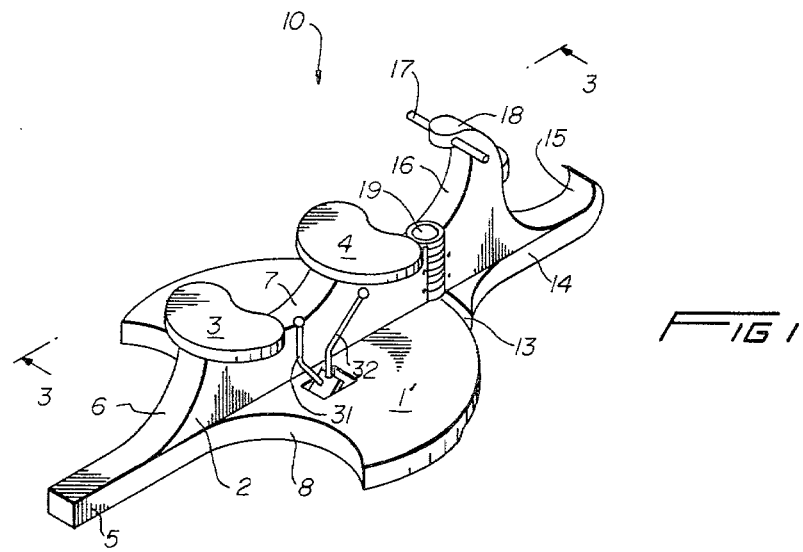
FIG. 1 is a perspective view of the apparatus according to the present invention.

Referring to the drawings now, wherein like reference numerals refer to like parts throughout the several drawing figures, reference numeral 10 is directed to the snow-shuttle according to the present invention.

The snow-shuttle 10 can generally be seen as having a steering means disposed forwardly of a frame means and articulated relatively thereto, and brake means on the frame means adapted for frictional engagement with the terrain, commonly a snow-packed surface whereby the snow-shuttle 10 is controlled both steering and braking.

Specifically, the steering means shown in the drawing figures includes a terrain contacting runner 14 having a depending rib 24, and a leading edge of the runner 15 is provided with an arcuate contour so that variations in the snow terrain can easily be accomodated without having the nose of the shuttle device plow into or submarine into the snow. The trailing edge 13 of the steering means has a curved contour complemental to the leading edge of the frame to be described hereinafter. A medial support 16 is provided which extends upwardly from the runner 14, and the medial support carries on a top extremity 18 thereof a pair of handgrips 17 which are orthogonal to the direction of travel of the sled. A first portion of a pivot area is provided on a rearward edge of the medial support, wherein the first portion of the pivot area is defined by spaced, stacked apertured leaves 21 adapted to co-act with similarly formed leaves 20 on the frame to be described hereinafter.

Figure 2:
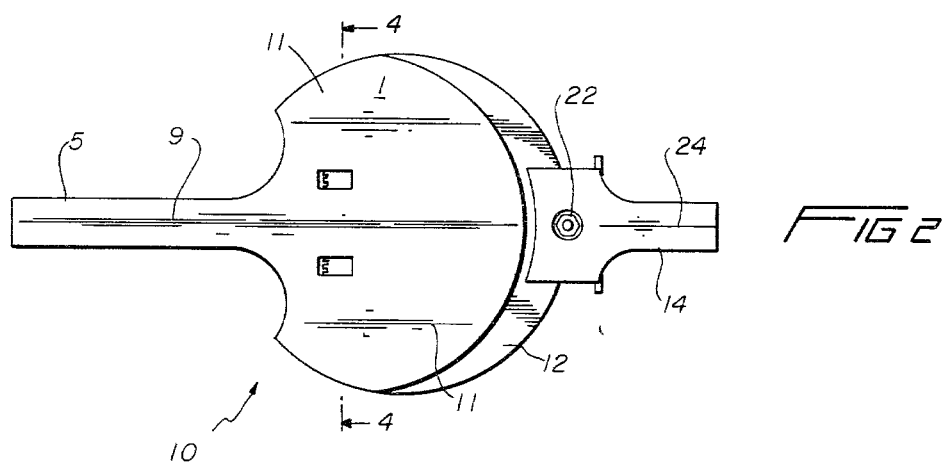
FIG. 2 is a bottom plan view thereof.
Figure 3:
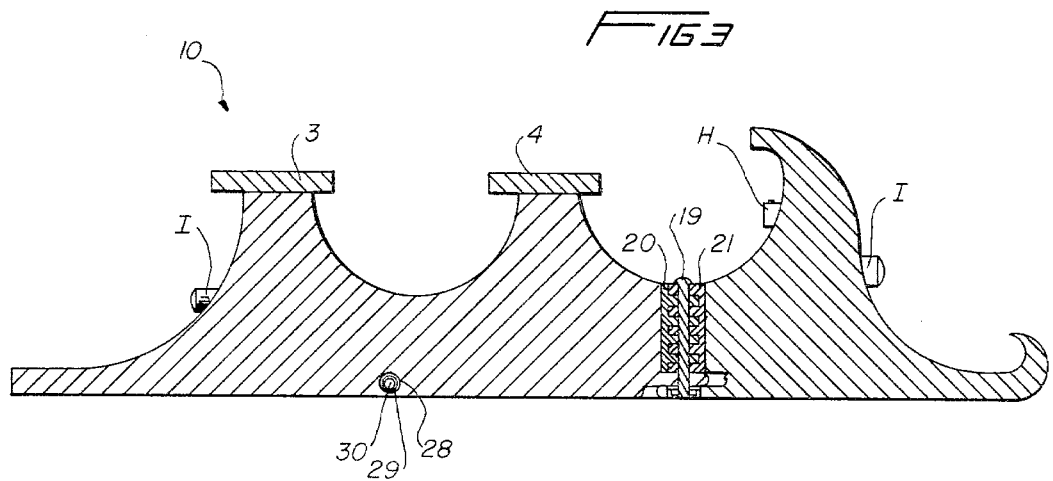
FIG. 3 is a sectional view taken along lines 3—3 of FIG. 1.

The frame portion of the snow-shuttle comprises a terrain contacting bottom surface 1 having a leading edge 12 turned upwardly so that similar to the leading edge 15 of the steering means, it can smoothly engage an uneven terrain. The top surface 1' of the frame can serve as a foot support area as will be evident in the drawings, and the general contour of the frame is of generally delta-wing configuration in which the leading edge has an arcuate contour, and the trailing edge is similarly curved. FIG. 2 indicates that the bottom surface 1 of the frame, like the steering means has ribs thereon, one rib 9 extending the entire length of the frame means including the rearwardly extending tail portion 5, whereas further ribs are disposed parallel to the longer rib 9, these parallel ribs 11 being on wings of the delta-shaped device. The bottom face of the shuttle 10 is provided with a dihedral so that preferably only the center rib is contacting the ground, to minimize resistance. Cut aways 40, 42 assist in this matter and the ribs 11 are higher than the central rib 9.

Seats 3 and 4 are provided on the frame, and these seats are carried by a wall member 2 having a compound contour 6 and 7 as suggested in FIG. 1 wherein the wall member extends upwardly from the tail 5 through a curved area 6. A second curved area 7 between first seat 3 and second seat 4 exists, and the front edge of the wall member serves as a support for the second portion of the pivot area as will now be defined. The second portion attached to the frame defines a pivot area formed from spaced stacked parallel apertured leaves 20 adapted for inter-digitative registry with corresponding leaves 21 on the steering means which are off-set so that the spaces of one set of leaves form the registry area for the other set of leaves. A pintle 19 is disposed through both sets of leaves when in registry, and a washer 23 and locknut 22 are provided so that the steering means can rotate relative to the frame means and provide the beneficial steering.

Figure 4:
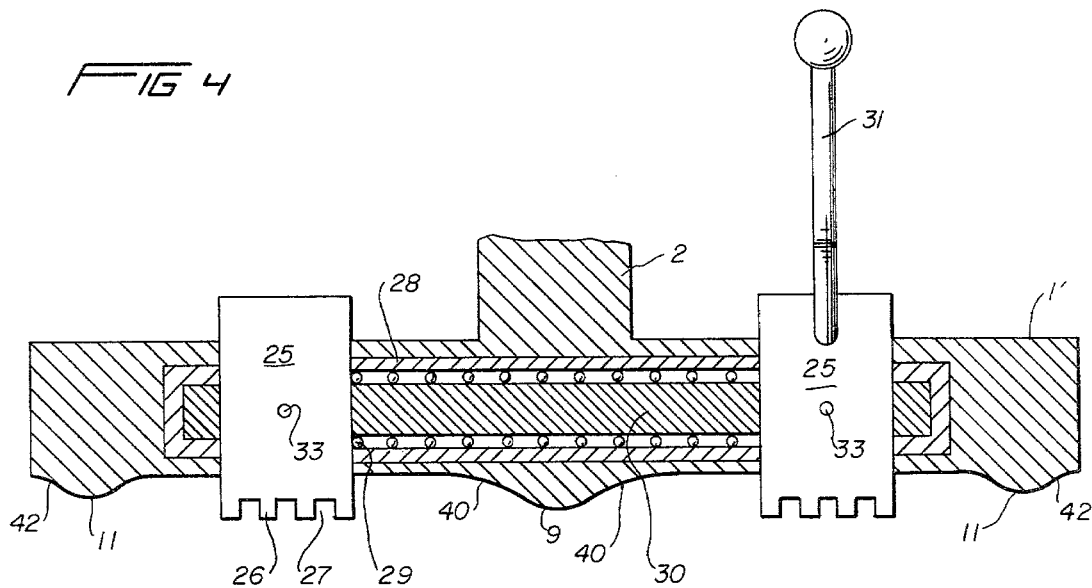
FIG. 4 is a sectional view taken along lines 4—4 of FIG. 2.
Figure 5:
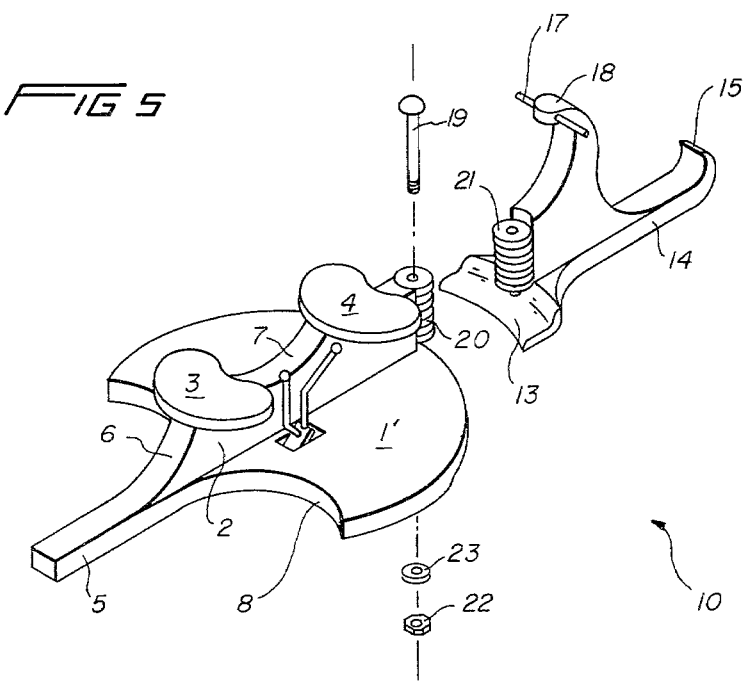
FIG. 5 is a perspective view similar to that shown in FIG. 1 with the inter-relationship between the steering and frame sections explicitly delineated.

Should the user of the snow-shuttle desire to come to a complete stop or appreciably decrease the speed of the device, a braking means has been provided which include as shown in FIG. 4 a sleeve 28 embedded within the frame substantially symmetrical relative to the wall center portion 2 and the sleeve 28 has disposed therein plural bearings 29 to allow frictionless rotation of an inwardly disposed rod 30. A cleat member formed from a plate 25 is slid through the sleeve and affixed to the rod 30 as through pin members 33 so that rotation of the rod and the plate 25 can occur, and by suitable manipulation or rotation of the rod as through handle 31, or handle 32, the cleats 26 which depend downwardly from the plate 25 can be put into frictional engagement with the terrain. To deter the buildup of ice and snow, cleared areas 27 are placed between teeth of the cleats for reliability in use.

It is also contemplated that the snow-shuttle can be used in the evening, and for this purpose, illumination means I are placed forwardly and rearwardly of the vehicle, and a horn H can be included so that people in the vicinity can be appropriately advised.

Having thus described the invention, it should be apparent that numerous structural modifications are contemplated as being a part of this invention as set forth hereinabove and as defined hereinbelow by the claims.

What is claimed is:

1. A snow-shuttle comprising, in combination:
a frame means for placement on terrain, having seating means on a top portion thereof, a terrain contacting bottom surface, a leading edge of which has an upwardly turned contour, and a top surface which provides a foot support area, depending ribs on said bottom surface, said seating means includes an upstanding wall member carrying seats thereon, a front face of said wall member having a second portion of pivot area defined by spaced, stacked apertures leaves oriented for interdigitation with a one other portion, and a pintle extending therethrough,
a steering means disposed forwardly of said frame means and articulated thereto, having a terrain contacting runner, handgrips extending from said runner, said one portion pivot area between said frame means and said runner, a depending rib on said runner having an upwardly curved leading edge, said hand grips connected to said runner through a medial support having at said one portion of said pivot area thereon spaced stacked apertured leaves,
and brake means on said frame means adapted for frictional engagement with the terrain whereby said snow-shuttle is controlled by both said steering means and said brake means, wherein said brake means comprises a reinforcing rod disposed in said frame means, cleat means extending through said rod and frame means, and handle means for orienting said cleat means from a terrain engaging to a non-engaging position.

2. The device of claim 1 wherein brake means further comprises a sleeve overlying said rod and embedded in said frame a bearing surface between said sleeve and said rod for easy rotation of said rod, said cleat means fastened through said rod and rotatable therewith, said cleat means formed from a plate and having downwardly depending spaced teeth.

3. The device of claim 2 wherein said frame means top and bottom surface forms a delta-wing with an arcuate leading edge, a cutaway, arcuate trailing edge and a rearwardly extending linear tail.

4. The device of claim 3 wherein said steering means has a trailing edge complemental to the leading edge of said frame means to resist snow and ice formation therebetween.

5. The device of claim 3 including illumination means and horn means operatively disposed on said shutttle.

* * * * *